INVENTOR
LAURENCE L. ROSIER
BY Joseph C. Redmond, Jr.
ATTORNEY

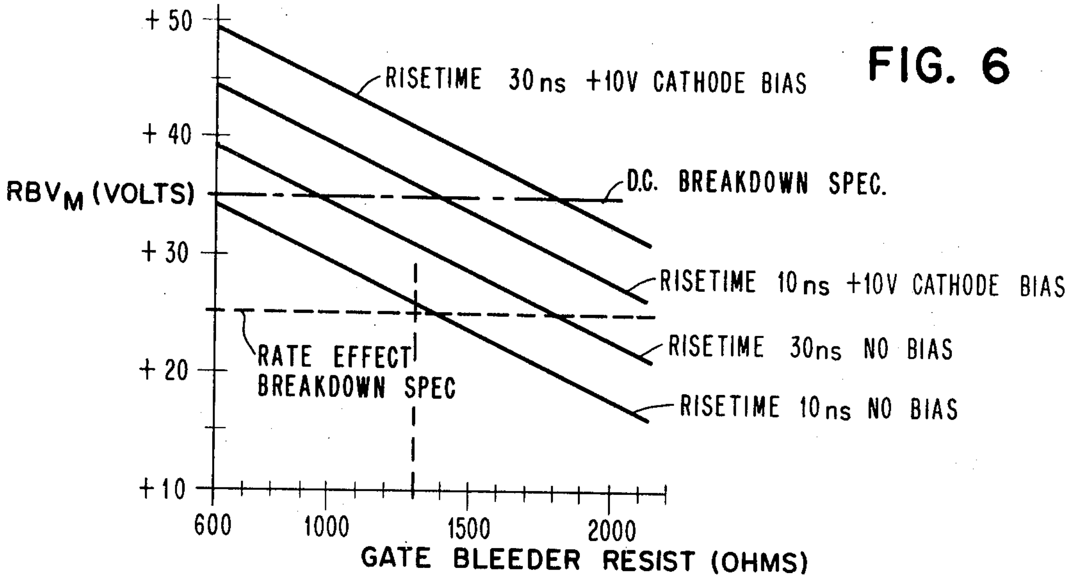
FIG. 6
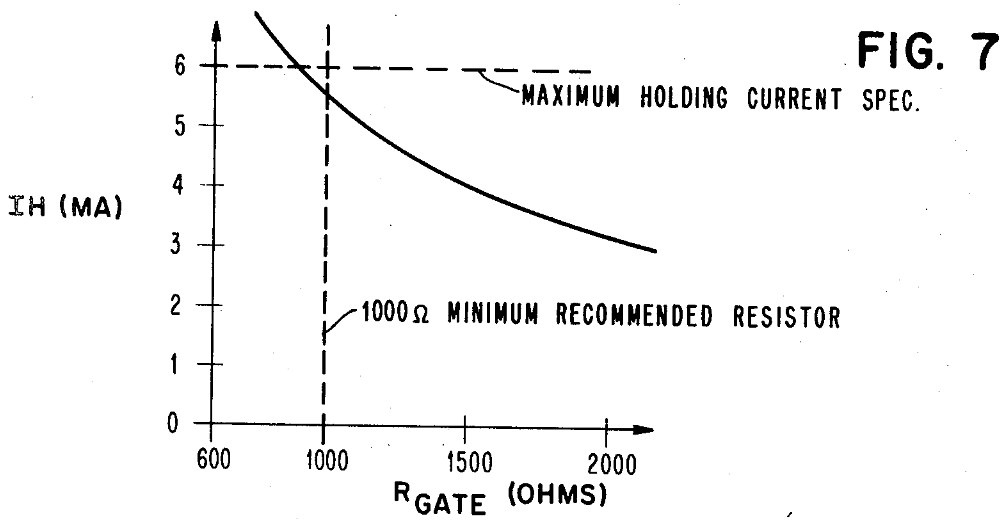
FIG. 7
FIG. 5
| RBV IN VOLTS | CATHODE BIAS | RISETIME | | |
|---|---|---|---|---|
| | | 7ns | 30ns | 90ns |
| SUBSTRATE FLOATING | 0 | 5 | 5 | 7.5 |
| | +10 | 12 | 12 | 18 |
| | +20 | 20 | 20 | 28 |
| SUBSTRATE TIED TO CATHODE | 0 | 19 | 22 | 38 |
| | +10 | 30 | 35 | >45 |
| | +20 | 42 | >45 | >45 |

United States Patent Office
3,517,280
Patented June 23, 1970

3,517,280

FOUR LAYER DIODE DEVICE INSENSITIVE TO RATE EFFECT AND METHOD OF MANUFACTURE

Laurence L. Rosier, Champaign, Ill., assignor to International Business Machines Corporation, Armonk, N.Y., a corporation of New York Filed Oct. 17, 1967, Ser. No. 675,865
Int. Cl. H01l 19/00
U.S. Cl. 317—235 5 Claims

ABSTRACT OF THE DISCLOSURE

Communication switching devices or crosspoints may be readily fabricated in integrated semiconductor devices through an appropriate choice of materials and processes. Such devices, however, are susceptible to "rate effect" which is the sensitivity of a non-selected crosspoint in a communications system to premature firing as a result of steep waveforms developed when other crosspoints in the system are selected. Their sensitivity to "rate effect" may be reduced through appropriate connections between the device substrate and electrodes; biasing of device electrodes and proper choice of impedance magnitudes included in the devices.

BACKGROUND OF THE INVENTION

Field of invention

This invention is directed to integrated semi-conductor devices, circuits and processes of fabrication. More particularly, the invention is directed to communication switches or crosspoints fabricated in integrated form and having reduced parasitic capacitance.

Description of prior art

Typically, a crosspoint switch includes a four layer diode or thyratron device having anode, gate and cathode electrodes. Individual diodes may be connected to anode, gate and cathode electrodes to isolate the thyratron from any adjacent circuits. A bleeder resistance may be connected between the gate and cathode electrodes to decrease the thyratron sensitivity to noise voltages capable of causing untimely switching. Preferably, crosspoints are fabricated from discrete components. The switching speeds and manufacturing costs for such crosspoints must be improved for present day communications service. Fabrication of crosspoints components in an integrated semiconductor device will permit shorter switching paths with attendant increased switching speed and decreased manufacturing cost. One of the major difficulties encountered in crosspoints fabricated in integrated semiconductor form resides in undesired switching of non-selected crosspoints from steep waveforms created by the switching of selected crosspoints. This undesired switching of non-selected crosspoints from steep waveforms is known as "rate effect." This effect is principally due to the parasitic capacitance in the integrated semiconductor device which are charged by the steep waveforms and discharge through the cathode of the thyratron to cause undesired firing thereof. It is desirable, therefore, to fabricate one or more communication switches or crosspoints in integrated form to achieve increased switching speed without adverse affect from the "rate effect" and lower manufacturing cost.

SUMMARY OF THE INVENTION

An object of the present invention is one or more crosspoint switches fabricated in an integrated semiconductor device.

Another object is an integrated crosspoint switch that is substantially insensitive to "rate effect."

Another object is an integrated crosspoint switch having substantially reduced parasitic capacitance.

Another object is a method for fabricating one or more crosspoints in an integrated semiconductor device.

Another object is a method of fabricating an integrated crosspoint to be substantially insensitive to "rate effect."

Still another object is a method of fabricating one or more integrated crosspoints to have reduced parasitic capacitance.

In accordance with one form of the present invention, one or more crosspoint switches are formed on a semiconductor crystal having a substrate portion of one conductivity type or $P^-$. Each crosspoint includes high conductivity regions of a second or $N^+$ conductivity type. An epitaxial layer is suitably formed over the $P^-$ crystal and $N^+$ regions, the layer being of N conductivity type. Each crosspoint region further includes first and second areas and associated high conductivity regions. The first area comprises a thyratron device in planar form having a first or anode electrode, a second or floating electrode, a third or base or blocking electrode, and a fourth or cathode electrode. The second area includes a diffused resistor and an isolating diode. All electrodes, diodes, and resistors are formed in the area by conventional photolithographic and diffusion processes. Isolation diffusion of $P^+$ conductivity type are established between the areas of each crosspoint. Metallurgy is deposited on the surface of each crosspoint to provide anode, gate and cathode terminals. The anode terminal is directly connected to the anode electrode. The gate terminal is connected to one side of the isolating diode. The other side of the isolating diode is connected to one side of the diffused resistor and to the base electrode. The cathode terminal is connected to the cathode electrode; the other side of the diffused resistor and to the substrate.

One feature of the invention is connecting the cathode to the substrate which short circuits the PN junction or parasitic capacitance that exist between each area and the substrate, these parasitic capacitances in the absence of such a connection permitting a capacitive current to flow around the gate, base or blocking electrode to the cathode to cause firing of the thyratron.

Another feature is positively biasing the second electrode to place in series the capacitance between the first and second electrodes to the capacitance between the second and third electrodes, thereby reducing the total capacitance of the thyratron.

Another feature is selecting the magnitude of the diffused resistor to reduce holding and firing current of thyratron as a result of the connection between the cathode terminal and the substrate.

The foregoing and other objects, features and advantages of the invention will be apparent from the following more particular description of the embodiments of the invention, as illustrated in the accompanying drawings:

BRIEF DESCRIPTION OF THE DRAWINGS

In the drawings:

FIG. 5 is a tabulation showing rate blocking voltages (RBV) at the anode of the thyratron of FIG. 1 as a function of rise time in nanoseconds (ns.) of RBV as applied to the anode where (1) the cathode is tied to the substrate, and (2) cathode is disconnected from the substrate.

FIG. 6 is a graph of rate blocking voltages vs. resistor impedance for various rise times of signals applied to the anode and voltages applied to the cathode of the thyratron shown in FIG. 1.

FIG. 7 is a graph of holding current in milliamperes applied to the gate electrode vs. diffused resistor magnitudes for the thyratron of FIG. 1.

DESCRIPTION OF THE PREFERRED EMBODIMENTS

Figure 1:
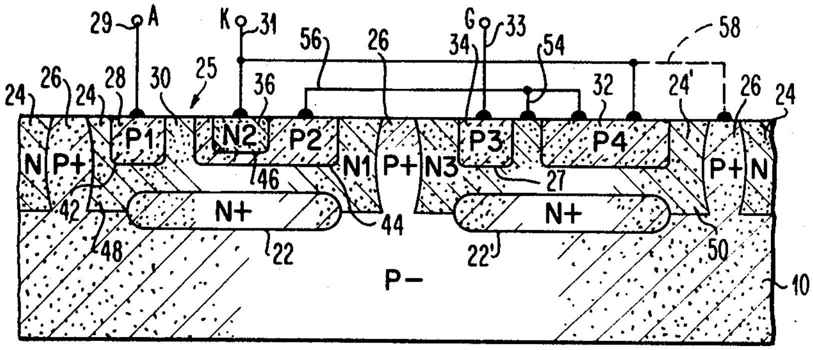
FIG. 1 is a diagrammatic view of one crosspoint, in an array of crosspoints, that illustrates the principles of the present invention.
Figure 1A:
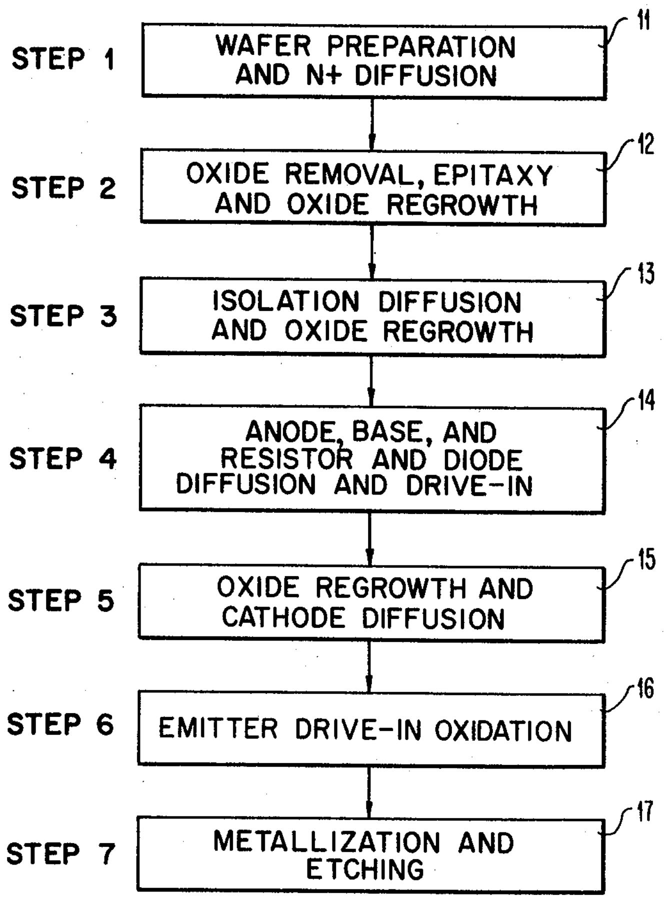
FIG. 1A is a flow diagram for fabricating the invention of FIG. 1.

Referring to FIGS. 1 and 1A, a wafer 10 of $P^-$ type conductivity, preferably having a resistivity of 20 Ωcm. is used as the starting material. The wafer is preferably a monocrystalline silicon structure which can be fabricated by conventional techniques such as by pulling a silicon semiconductor member from a melt containing the desired impurity concentration, and then slicing the pulled member into a plurality of wafers. The wafers in operation 11 are cut, lapped and chemically polished to 7.9 (±.8) mils thickness. The wafers are oriented 4° (±0.5°) off the (111) axis in the (110) direction.

An initial oxide layer or coating (not shown), preferably of silicon dioxide and having a thickness of 5200 A. units, is thermally grown by conventional heating in a dry $O_2$ atmosphere for 10 minutes, followed by heating in a wet or steam atmosphere at 1050° C. for 60 minutes. If desired, the oxide layer can be formed by pyrolitic deposition or by RF sputtering techniques as described in a previously filed application, Ser. No. 428,733, filed Jan. 28, 1965, now U.S. Pat. 3,369,991 and assigned to the same assignee as the present invention.

By standard photolithographic masking and etching techniques, a photoresist layer (not shown) is deposited onto the wafer including the surface of the initial oxide layer formed thereon and by using the photoresist layer as a mask, surface regions are exposed on the surface of the wafer by the desired portions of the $SiO_2$ layer with a buffered hydrofluoric solution. The photoresist layer is then removed to permit further processing.

A diffusion operation is carried out to diffuse into the surface portion of the wafer N type impurities to form $N^+$ regions 22, 22', in the wafer having a surface concentration $C_0$ of $2\times10^{20}$ cm.$^{-3}$ of N type majority carriers. The initial oxide layer serves as a mask to prevent an $N^+$ region from being formed over the entire surface of the wafer. Preferably, the diffusion operation is carried out in an evacuating quartz capsule using degenerate arsenic doped silicon powder. As an alternative variation, the $N^+$ region can be formed by etching out a channel in a $P^-$ type wafer and subsequently growing $N^+$ regions.

After removing the oxide layer, in operation 12, a region of N type conductivity 24, preferably having a resistivity of about 0.2 ohm/cm. is epitaxially grown on the surface of the wafer. The N type epitaxial region is an arsenic doped layer approximately 9.0–10.0 microns thick. In actual device fabrication, the arsenic impurities in the $N^+$ region which are now buried, out diffuse about 1 micron during the epitaxial deposition.

Another oxide layer (not shown) approximately 5200 A. is formed on the surface of the epitaxially grown region either by the same thermal oxidation process or by pyrolitic deposition or by RF sputtering techniques previously indicated.

A number of dopings will be formed in specific areas of the silicon by standard photolithographic etching techniques using a photoresist layer as a mask and a buffered HF solution for etching away the oxide portion. The structure is now prepared for a second diffusion operation which is for isolation of the active and passive devices to be subsequently formed.

A P type diffusion step is carried out, in an operation 13, preferably using a boron source, to form $P^+$ regions 26 in the N type epitaxially grown layer. This diffusion operation is carried out at a temperature of 1200° C. for a period of 95 minutes forming a $C_0$ of $5\times10^{20}$ cm.$^{-3}$. It is evident that the $P^+$ diffused region will each have a low resistivity surface region which extends downwardly from the semiconductor structure. In forming isolation diffusions, the diffused $P^+$ type region reaches and becomes continuous with the original substrate with $P^-$ starting material. The isolation region 26 separates each crosspoint into a first area 24 into which a thyratron device 25 will be subsequently formed and a second area 24' into which an isolation diode 27 and a diffused resistor 32 will be formed.

Another oxide layer (not shown) is formed after the isolation operation. This oxide layer is preferably 4300 A. units thick and can be formed by thermal oxidation processes such as by heating at 1050° C. for a period of 5 minutes in dry oxygen followed by 15 minutes in steam and 15 minutes in dry oxygen.

A photoresist coating (not shown) is applied to the surface of this oxide layer by photolithographic and etching techniques. Desired portions of the $SiO_2$ layer are removed using a buffered HF solution.

An anode 28, base 30 and/or resistor diffusion 32 is now carried out in an operation 14, preferably using boron as the impurity source. This diffusion operation is for 70 minutes at 1075° C. and forms P type regions having an impurity surface concentration of $5\times10^{19}$ cm.$^{-3}$. A diode 34 is also formed by this latter diffusion by simultaneous reoxidation and drive-in operation. Another layer of $SiO_2$ (not shown) is grown having a thickness of about 3600 A. on the anode, base, diode and resistor regions. During this heat treatment, the boron impurities are redistributed thereby increasing the junction depth in lowering the $C_0$. The oxidation drying cycle is 25 minutes in dry oxygen and 10 minutes in steam followed by 15 minutes in dry oxygen at 1150° C.

An N type cathode region 36 is formed in the P type base region by an operation 15 using preferably, a phosphorus impurity such as $P_2O_5$ or $POCl_3$. In one form, the wafer is heated in an atmosphere containing 700 parts per million of $POCl_3$ at a temperature of 970° C. for 5 minutes. Preferably, the emitter and base regions are formed over the buried $N^+$ region 22 to permit this region to act as a buried low resistivity subcollector.

A final oxidation and emitter drive-in operation is formed in an operation 16 using a 5 minute dry $O_2$, 55 minute steam cycle followed by dry $O_2$ heat treatment (for a period of time depending on the depth of the collector) at 970° C. During this treatment a final oxide layer (not shown) is formed on the semiconductor surface.

Figures 2, 3, 4:
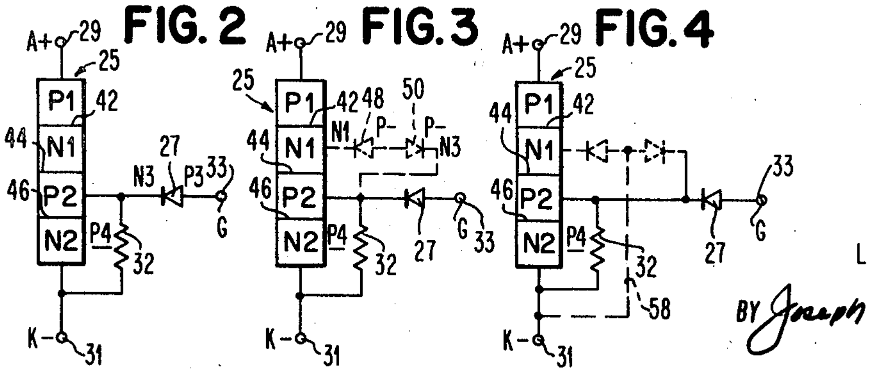
FIG. 2 is an electrical schematic of a crosspoint switch represented in FIG. 1.
FIG. 3 is an electrical schematic showing the parasitic capacitances included in the embodiment of FIG. 1.
FIG. 4 is an electrical schematic of the parasitic capacitance of FIG. 3 after connecting the cathode terminal and substrate of the embodiment shown in FIG. 1.

In photolithographic masking and etching techniques holes are employed to open portions of the oxide layer on the areas 24 and 24' to interconnect the thyratron 25, diode 27 and resistor 32 of FIG. 2.

A layer of aluminum or other metallurgy (not shown) is evaporated in an operation 17 over the entire surface and a portion of this layer is etched away to produce the desired interconnection pattern shown in FIGS. 1 and 2. The evaporated layer of aluminum has a thickness of 6000 A. units which was formed by depositing aluminum at a rate of 45 A. per second in a vacuum of $5\times10^{-6}$ torr. 1500 A. units are deposited at a wafer temperature of 200° C. and the remaining 4500 A. units at a temperature less than 100° C. A layer of photoresist (not shown) is then applied, and the wafer dried, exposed, developed and fixed. The aluminum interconnections are formed by a subtractive etching process using a warm solution of $$H_3PO_4+HNO_3+H_2O$$

The photoresist layer is stripped off and the wafers cleaned and dried.

The wafers are sintered in a nitrogen atmosphere at 450° C. for 15 minutes to permit the aluminum to produce good ohmic contacts or terminals 29, 31 and 33 contacted to the anode 28, cathode 36 and diode 27, respectively, in the wafer.

Although for purposes of describing this invention, references made to a semiconductor configuration wherein a $P^-$ type region was utilized as the substrate and the subsequent semiconductor regions of the composite semiconductor structure are formed in the conductivity type described, it is readily apparent that the same regions being referred to as one conductivity type can be of the opposite conductivity and, furthermore, some of the operations which are described such as diffusion operations can be made by epitaxial growth and some of the epitaxial growth regions can be made by diffusion techniques.

Further details on materials and processes for fabricating devices of the type described in FIG. 1 may be found in a previously filed application, Ser. No. 539,210, filed Mar. 31, 1966, and assigned to the same assignee as the present invention, and concerning a related device.

Returning to FIG. 2, the thyratron device 25 is caused to conduct when appropriate signals are placed at the anode 29 and gate 33 terminals. Diode 27 aids in isolating the thyratron from other crosspoints. Bleeder resistor 32 is disposed between the base electrode and the cathode electrode decreases the thyratron sensitiveness to noise voltages which are capable of causing untimely switching.

Normally, anode junction 42 is forward biased, blocking junction 44 and cathode junction 46 reverse biased due to a signal of appropriate polarity (negative) and magnitude applied to terminal 33. Anode terminal 29 is connected to a positive supply which switches between 0 and 25 volts. Cathode terminal 31 is connected to ground or a positive supply between 0 and 20 volts depending upon the desired switching characteristics of crosspoint. When a positive potential (not shown) is applied to the gate electrode 33, the diode 27 is forward biased and the blocking and cathode junction forward biased to permit current to flow from the anode electrode to the cathode electrode.

Returning to FIG. 1, diode junction 42 being normally forward biased permits the substrate junctions 48 and 50 to be charged. The capacitances of these junctions are in parallel with the capacitance of the blocking junction 44 through connection 54. A capacitive current, therefore, is able to flow from anode terminal 29 to the base region by way of the substrate. When waveforms having rise time less than 90 ns., appear at the anode, the capacitance current is sufficient to cause firing of the thyratron in the absence of a connection 58, shown by a dotted line, to be described hereinafter.

FIG. 3 shows substrate junctions 48 and 50 or diodes as parasitic capacitances. The capacitance impedance of the parasitic path about blocking junction 44 is approximately:

$$X_c = \frac{Kt}{C}$$

where:

K is a constant related to $1/2\pi$ $X_c$ is the impedance of the reciprocal addition of capacitances associated with junctions 48 and 50, and $t$ is the rise time of a signal applied to anode terminal 29.

As rise time decreases, the equivalent capacitance impedance decreases for the parasitic or bypass around blocking junction 44. The capacitance current increases as the equivalent impedance of the parasitic path is reduced. When the rate of change of the voltage at the anode terminal 29 is sufficient, the resulting capacitance current will be sufficiently large to cause firing of the thyratron. This characteristic of an integrated cross-point to fire is defined as the "rate effect."

Returning to FIG. 1, momentarily, the "rate effect" may be overcome by connecting the substrate to the cathode terminal 31 through connection 58. The grounded substrate, shown in FIG. 4 by connection 58, prevents the capacitive current from flowing into the base or gate region. Connection 58 increases the effective blocking voltage of the junction 44 as will now be shown by the table of FIG. 5.

The table is based upon observed voltages and the rise time of signals, applied at anode 29 (see FIG. 1) which will cause firing of the thyratron for various reasons on cathode 36 when the substrate is (1) floating or (2) tied to the cathode. These observed voltages represent threshold voltages for firing of the thyratron and are defined as "rate effect breakdown voltages" (RBV), and are tabulated under rise times in nanoseconds (7 ns., 30 ns., 90 ns.) of the voltages. The higher an RBV the more insensitive the thyratron is to "rate effect."

FIG. 5 confirms that the voltages (RBV) which initiate thyratron conduction for condition (2) are approximately 2 to 3 times larger than the voltages (RBV) indicated for condition (1). FIG. 5 further indicates that as the rise time of the waveform increases (7 ns. to 90 ns.) the RBV increases due to the higher impedance of the parasitic path.

Another alternative for minimizing or eliminating "rate effect" in the device of FIG. 1 is to reverse bias the anode junction 42 through a voltage supply of appropriate magnitude (not shown). A positive voltage connected to the electrode 30 through an appropriate terminal (not shown) reverse biases the junction and the capacitance thereof is combined with that of blocking junction 44. The total serial capacitance of the anode and blocking junction is reduced thereby increasing the equivalent capacitance impedance of the main current conducting path in the thyratron.

It can be shown that the substrate to cathode connection increases the holding current and firing current of the thyratron which is an undesirable effect. An increase in the holding current of the order of 50 to 100% may be expected. An increase in the gate current of the order of 30 to 50% may be expected. The gate bleeder resistance 32 may be selected to reduce these currents but with adverse side effects on the RBV. It is desirable to select a resistor 32 which effects the most desirable compromise among the rate effect breakdown voltage, holding current and firing current.

Th maximum magnitude for the gate bleeder resistance is obtained from a plot of rate breakdown voltage (RBV) in volts vs. bleeder resistance, as shown in FIG. 6, for the device of FIG. 1. FIG. 6 indicates that as the gate bleeder resistances increase, the rate breakdown voltage decreases in a linear manner. A rate effect breakdown voltage is selected based upon the expected step pulse to be applied to the anode of the thyratron. For purposes of the present dscription, a 25 volt rate effect breakdown was selected. The maximum bleeder resistance, therefore, is approximately 1300 ohms. Any value greater than a 1300 ohm bleeder resistance will reduce the rate effect breakdown voltage.

The minimum magnitude of the gate bleeder resistance is obtained from a plot of holding current in milliamps (gate electrode) versus gate bleeder resistances in ohms, as shown in FIG. 7, for the device of FIG. 1. The minimum resistor magnitude must be selected to produce a holding current less than the maximum holding current for the device shown in FIG. 1. FIG. 7 shows that the bleeder resistor should be about 1000 ohms to keep the holding current less than 6 ma., the maximum holding current.

The optimum bleeder resistor should be between 1000–1300 ohms for the best compromise among RBV, holding and firing current, as will now be shown. Firing current for the device of FIG. 1 is given by the following relation:

$$I_f = \frac{V_f(1+\beta)}{R_{gate}}$$

where:

$I_f$=firing current
$V_f$=firing voltage
$\beta = I_c$ (collector current)$/I_b$ (base current)
$R_{gate}$=optimum bleeder resistance magnitude Firing voltage is a constant usually of the order of .5 volt for silicon type devices shown in FIG. 1. The optimum firing current therefore, is inversely proportional to the optimum bleeder resistance. Thus, a compromise is achieved among rate breakdown voltage, holding current and firing current to obtain the best operating condition for device based upon a selected magnitude for the bleeder resistance.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A semiconductor integrated circuit comprising:
   - a body of semiconductor material predominantly of one conductivity type and having a first major surface;
   - first regions of opposite conductivity type in PN junction forming relation with at least one portion of the first major surface of said body;
   - an epitaxial layer of opposite conductivity type to said body extending over the first major surface and covering the first regions;
   - isolating regions of one conductivity type in said epitaxial layer whereby zones of opposite conductivity type are formed in said epitaxial layer;
   - one zone including a four layer diode device having anode, gate, base and cathode regions, said base region forming a first leakage path with said body;
   - a second zone having a pair of regions of opposite conductivity type which form an active element and a passive element;
   - means connecting the diode, active element and passive element in a circuit whereby a second leakage path exists between the body and the second zone, said second leakage path being in series with said gate and said first leakage path; and
   - means connecting the body to the cathode region to prevent premature conduction of the diode from rate effect voltages.

2. The circuit defined in claim 1 wherein the means for preventing premature conduction of the diode device is a direct connection between the body and the cathode region.

3. The circuit defined in claim 1 wherein the active element is a diode and the passive element is a resistor.

4. The switch of claim 3 wherein the resistor magnitude ($R_g$) is $V_f(1+\beta)/I_f$ where $I_b$, $I_c$, $I_f$ are the base, collector and firing currents, respectively, of the diode, $\beta$ is the collector-base current gain and $V_f$ the firing voltage.

5. A semiconductor integrated circuit comprising:
   - a body of semiconductor material predominantly of one conductivity type;
   - isolated zones of opposite conductivity type in said body;
   - one zone including a four layer diode device having anode, gate, base and cathode regions, said base region forming a first leakage path with said body;
   - a second zone having a pair of regions of opposite conductivity type which form an active element and a passive element;
   - means connecting the diode, active element and passive element in a circuit, whereby a second leakage path exists between the body and the second zone, said second leakage path being in series with said gate and said first leakage path; and
   - means interconnecting the body and cathode to prevent premature conduction of the diode device from rate effect voltage.

References Cited

UNITED STATES PATENTS

| | | | |
|---|---|---|---|
| 3,260,902 | 7/1966 | Porter | 317—235 |
| 3,395,320 | 7/1968 | Ansley | 317—235 |
| 3,423,650 | 1/1969 | Cohen | 317—235 |
| 3,434,022 | 3/1969 | Byrd | 317—235 |

FOREIGN PATENTS 1,058,067 2/1967 Great Britain.

OTHER REFERENCES

How to Suppress Rate Effect in PNPN Devices, by Stasior, June 1964, 4 pages.

Semiconductor Products, "Integrated Semiconductor Networks in Electromechanical Control Systems," by Abbott et al., October 1963, pp. 15–19.

JERRY D. CRAIG, Primary Examiner

U.S. Cl. X.R.

307—303, 305